R. LEIDORF.
AEROPLANE.
APPLICATION FILED NOV. 7, 1910.

996,932.

Patented July 4, 1911.
4 SHEETS—SHEET 1

ATTEST
E. M. Fisher
I. C. Musson

INVENTOR
ROBERT LEIDORF.
BY Fisher & Elliott ATTYS

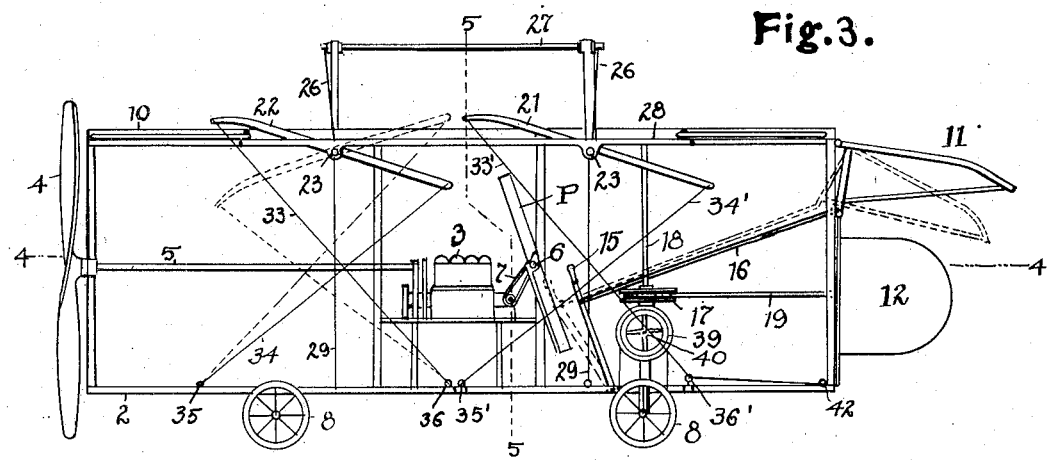
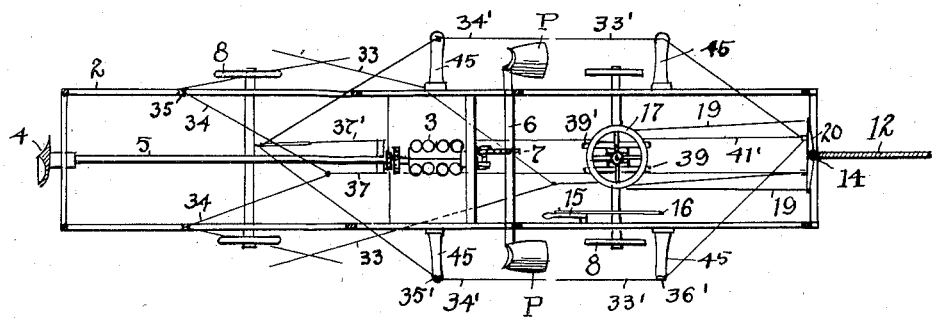
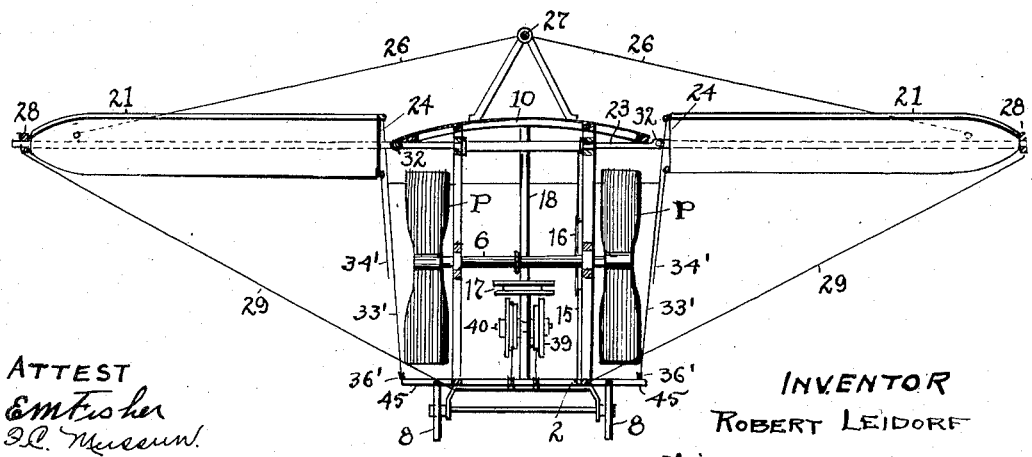

R. LEIDORF.
AEROPLANE.
APPLICATION FILED NOV. 7, 1910.

996,932.

Patented July 4, 1911.

4 SHEETS—SHEET 3.

ATTEST
E. M. Fisher
F. C. Musson

INVENTOR
Robert Leidorf
BY Fisher & Moser ATTYS

R. LEIDORF.
AEROPLANE.
APPLICATION FILED NOV. 7, 1910.
996,932.
Patented July 4, 1911.
4 SHEETS—SHEET 4.
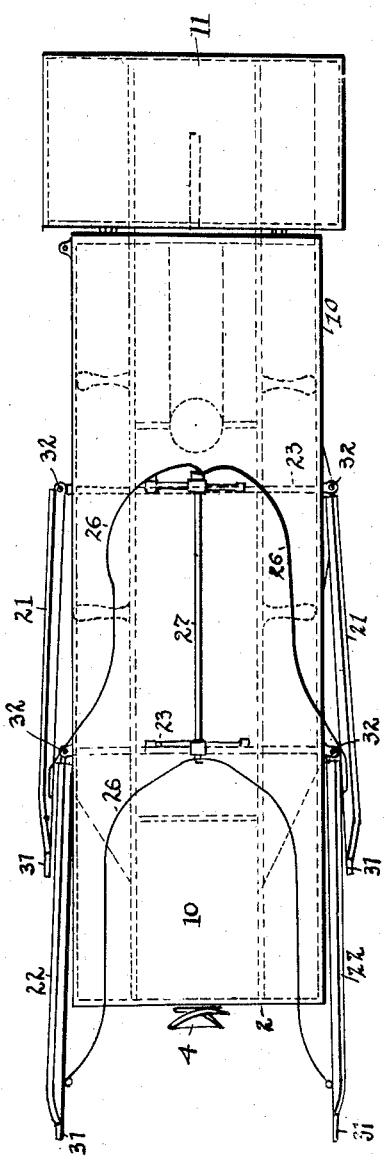
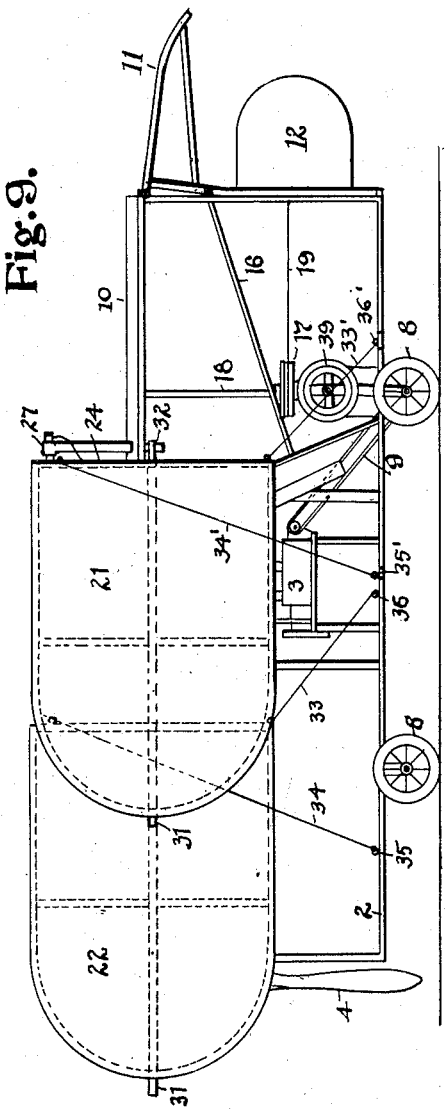
ATTEST
E. M. Fisher
J. C. Mussun
INVENTOR
ROBERT LEIDORF
BY Fisher Moser ATTYS

UNITED STATES PATENT OFFICE.

ROBERT LEIDORF, OF CLEVELAND, OHIO.

AEROPLANE.

996,932.   Specification of Letters Patent.   Patented July 4, 1911.

Application filed November 7, 1910. Serial No. 591,092.

*To all whom it may concern:*

Be it known that I, ROBERT LEIDORF, a citizen of the United States, residing at Cleveland, in the county of Cuyahoga and State of Ohio, have invented certain new and useful Improvements in Aeroplanes, of which the following is a specification.

My invention relates to improvements in aeroplanes, and the improvements consist in the construction and arrangement of parts substantially as herein shown and described and more particularly pointed out in the claims.

My object is embodied in an aeroplane adapted to have stability and a large factor of safety in flight and to this end comprises separate sets of rotatable wings or planes. Under adverse conditions these wings serve to buoy or keep the aeroplanes from sinking too rapidly particularly when said wings or planes are manipulated and set at reverse angles to one another.

A further object is embodied in the jointed connections for the wings or planes, whereby said wings may be folded against the sides of the main frame so that the aeroplane may be conveniently transported when on the ground.

Figure 1:
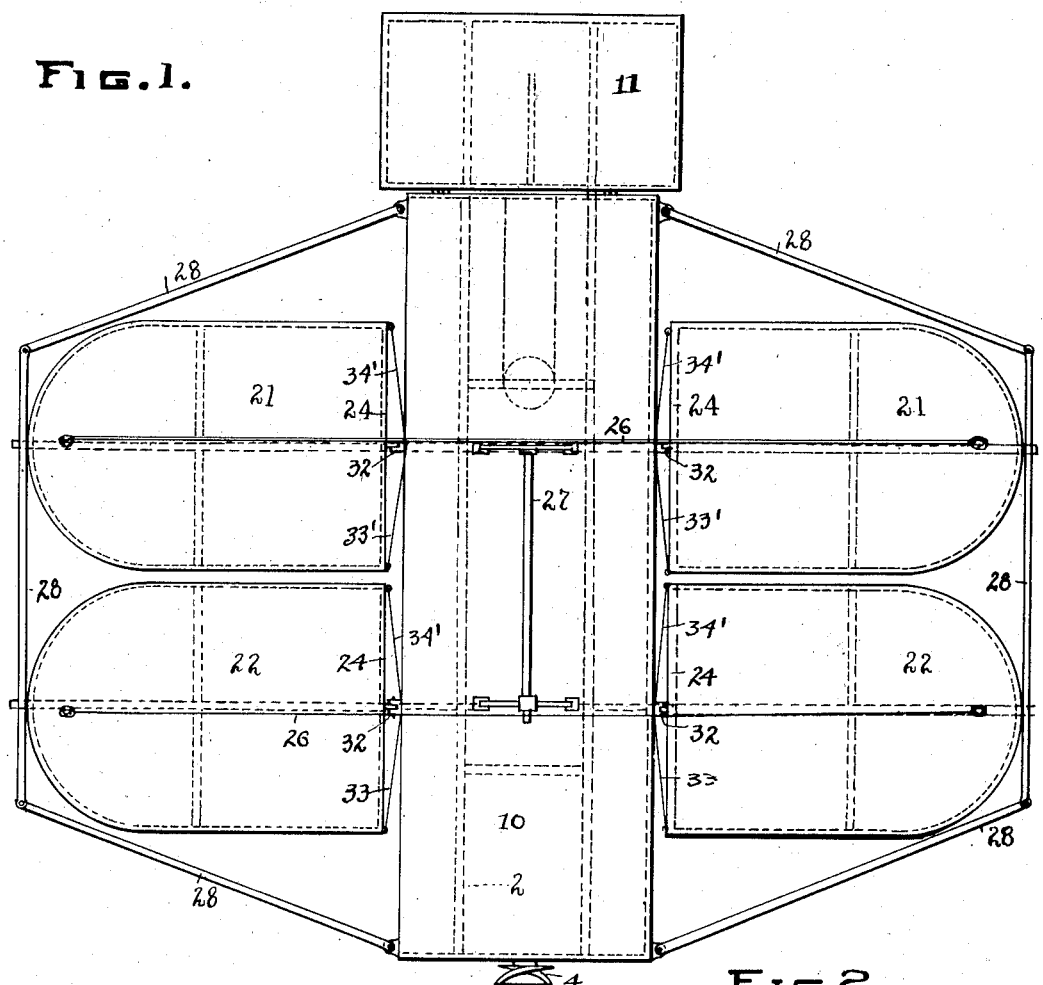
Figure 2:
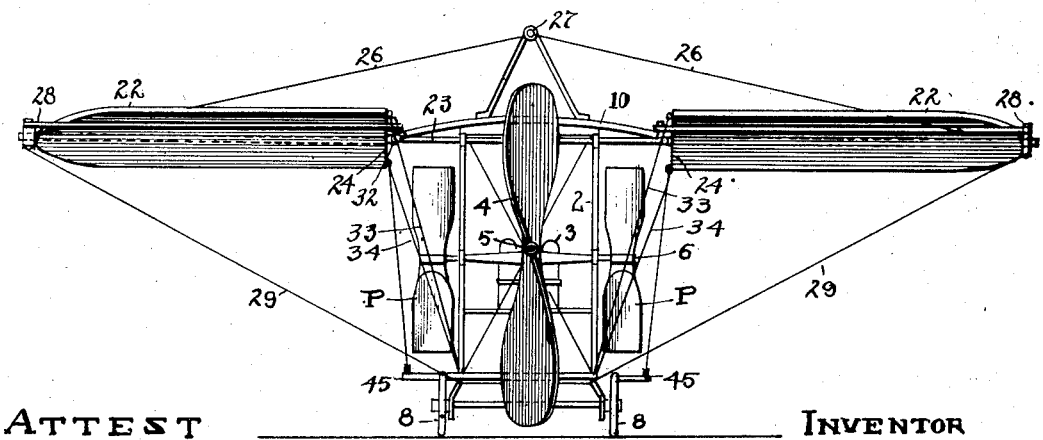
Figure 6:
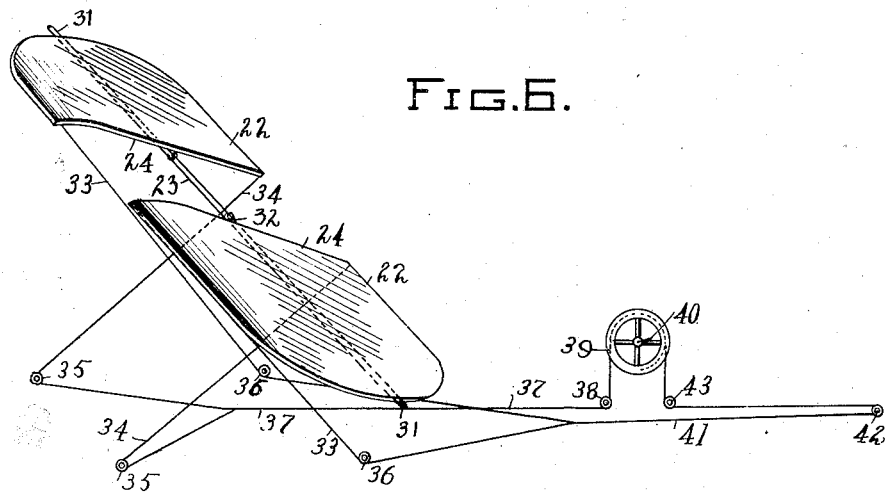
Figure 7:
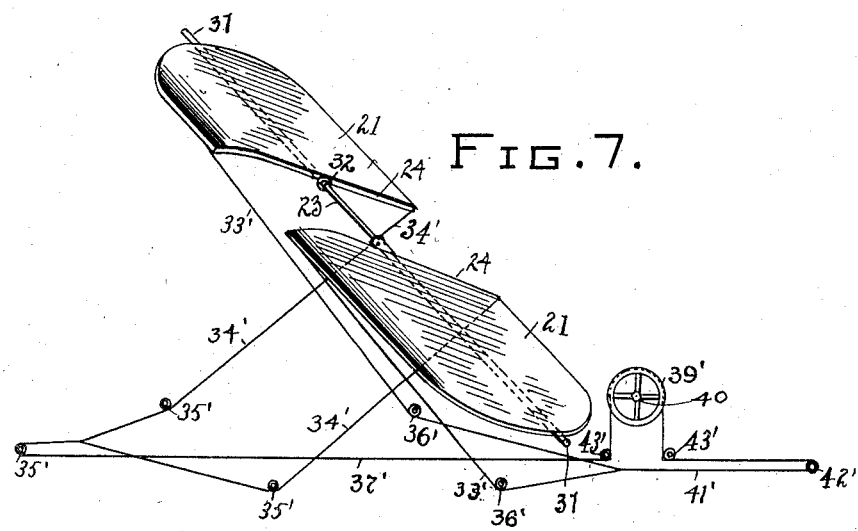

In the accompanying drawings, Figure 1 is a top plan of my improved aeroplane, and Fig. 2 is an end elevation thereof. Fig. 3 is a side view of the machine showing it as it appears in flight. Fig. 4 is a sectional view on line 4—4, looking downward. Fig. 5 is a cross section on line 5—5, Fig. 3. Fig. 6 is a diagrammatic view in perspective of the front pair of wings and their operating connections, and Fig. 7 is a similar view but of the rear pair of wings. Fig. 8 is a top view of the aeroplane with the wings folded, and Fig. 9 is a side elevation of Fig. 8.

The main frame 2 of my improved aeroplane is constructed of light material in the form of a rectangular skeleton, and is stayed and braced wherever necessary to give it the maximum rigidity and strength. However, various guy wires and braces have been purposely omitted from the drawings to avoid confusion of lines, particularly wherever they are not material to an understanding of the invention. An engine 3 is supported centrally within skeleton frame 2 and serves to drive propeller 4 at the front of the machine by means of longitudinal shaft 5 and gearing of any suitable kind. A transverse shaft 6 is also provided near the center of the machine which is driven by sprocket gearing 7 or its equivalent operated by motor 3. If desired suitable clutch mechanism may be used in the line of power connections, but this is optional and none has been shown. Shaft 6 extends beyond either side of frame 2 to support a pair of propellers P, also herein referred to as paddle-propellers to distinguish them from screw propeller 4. Frame 2 is mounted on wheels 8 at its bottom for purposes now common, and if desired, one or both sets of wheels 8 may be power driven from motor 3 by sprocket connections 9, see Fig. 9. This operating connection may be used when the machine is on the ground, but not when in flight.

The top 10 of frame 2 is arched transversely and is covered by a fabric stretched tightly thereover, thereby providing a fixed supporting plane the full length of the machine. A horizontally arranged extension 11 hinged at the rear of top 10 may be depressed up or down to change the angle of flight of the machine. A rudder 12 is mounted on a vertical post 14 at the rear of frame 2 intermediately beneath deflector 11. The operator controls deflector 11 by means of a pivoted lever 15 and its connecting link 16, and rudder 12 by wheel 17 rotatably mounted upon vertical standards 18, cables 19 passing from said wheel to cross-piece 20 rigid with post 14, see Fig. 4.

The means for sustaining the aeroplane in flight comprises in addition to the foregoing, two sets of lateral wings or planes 21 and 22, respectively, which are rigidly affixed to separate shafts 23 arranged in parallel relation transversely of the machine at the top of frame 2. These wings or planes are rounded at their outer side edges when viewed from the top and have straight inner side edges 24 paralleling the sides of the frame and arranged relatively near the side edges of top 10. Guy wires 26 connect the outer ends of wings 21 and 22 with a truss frame 27 mounted upon top 10 centrally between its sides and ends. A light inclosing frame 28 is detachably connected to top 10 at its respective ends and sides to support and journal the end portions 31 of rotatable shafts 23 therein. Guy wires 29 are also strung between the side pieces of frame 28 and the bottom portion of frame 2 to complete the bracing connections for wings 21 and 22. Now, it will be particularly noted that each shaft 23 is made in three parts and joined by knuckle or pivot connections 32. When alined or open, this divided shaft may be rotated in its bearings affixed to main frame 2. Thus, each set of wings or planes 21 and 22, respectively, may be independently rotated to change the angular position of the wings or planes to whatever degree the operator may determine or the conditions may require. Both may sustain the same angle of rest say as seen in Fig. 3, or rear planes 21 may be set at a different angle than planes 22. Again, planes 22 may be rotated and set at a reverse angle to planes 21, say as seen in dotted lines, Fig. 3, and which would be of service when the machine was settling, acting in this instance somewhat as a parachute to make a safe landing. Planes 21 and 22 are arranged relatively near to one another for this express purpose.

The lateral wings or planes 21—22 are always under control of the operator through cable connections and operating wheels, substantially as follows,—thus, referring to Fig. 6 showing front wings or planes 22, a set of flexible cords 33 and 34 connect with the inner side edges 24 of each wing at their front and rear edges respectively and said cords cross each other in passing to sheaves 35 and 36 mounted upon the base portion of frame 2. Cords 34 unite with a single cord 37 running back to sheave 38 beneath wheel 39 rotatably mounted on the horizontal transverse stud or axle 40 in standard 18, see Figs. 3 and 5, said wheel being beneath rudder controlling wheel 17. Cords 33 pass around sheaves 36 and unite with a single cord 41 which extends to the extreme rear end of frame 2 and passes around sheave 42 mounted thereon and thence back to a sheave 43 beneath wheel 39 but on the opposite side of its axle relatively to sheave 38. The ends of both cords 37 and 41 are fastened to wheel 39 after making a turn or two about the same so that when said wheel is rotated a pull upon one cord will occur while slack is yielded in a corresponding measure in the other cord, thereby tilting planes 22 to any degree through a common rotation of jointed shaft 23. The operation is positive and the planes will remain in any set position the operator may elect, and moreover, may be locked by any suitable contrivance if this is desired.

A similar arrangement to the foregoing is provided for rear planes 21, the only difference being in a slight change in the arrangement of the sheaves. Like reference numerals and letters, however, are used to designate like parts excepting that these numerals are primed to distinguish them from the others. But it must be understood that a separate wheel 39' is used to control and set planes 21, and this wheel 39' is mounted at the side of wheel 39 but on the opposite side of standard 18, see Fig. 5. Now referring to the jointed shaft arrangement for planes 21 and 22, respectively, the utility thereof is seen in Figs. 8 and 9 where planes 21 and 22 are folded against the sides of frame 2 in overlapping relation and which position of the parts is brought about when the machine is designed to run over the ground under its own power or when pushed. This is of advantage when the machine is to be shipped or transported by rail or boat or is moved or passed through narrow quarters. Obviously, supporting frame 28 must be detached to accomplish this result, and for this reason said frame is of a knockdown construction and is packed and carried separately, and furthermore each lateral plane must be brought to a substantially vertical position by a quarter rotation of shafts 23 before this folding can take place. Sheaves 35' and 36' are preferably mounted at the extremity of lateral arms 45 of frame 2 in order that clearance may be had for rotatable propellers P at either side of the frame.

What I claim is:

1. In an aeroplane, a main frame and separate rotatable shafts mounted transversely thereon, planes on the outer portions of said shafts and said outer portions being hinged to fold said planes against the sides of said frame, and operating devices having flexible means connected with the inner end edges of each plane wherewith the planes may be rotated and also permitted to fold without disconnecting the parts.

2. In an aeroplane, a main frame and a screw propeller at one end thereof and a deflecting plane at the other end and power connections for said propeller, in combination with a pair of paddle propellers rotatably mounted at either side of the axis of said screw propeller at approximately the middle of said main frame and at the outside thereof, side planes supported on folding shafts transversely of said main frame, flexible connections leading from the inner edge of said planes downwardly to said main frame outside of said paddle propellers, and winding devices at the front end of said main frame for said flexible connections.

3. In aeroplanes, a skeleton frame of rectangular form having a screw propeller mounted at one end thereof and a deflecting plane at the other end, in combination with a set of paddle propellers mounted at the sides of said frame approximately midway thereof, a motor and drive connections for said propeller, a pair of rotatable planes on each side of said frame, foldable shafts for opposite planes, and a knock-down inclosing frame for said planes detachably connected with the outer ends of said shafts.

4. In an aeroplane, a covered main frame of rectangular form and separate sets of rotatable planes the planes constituting a set being on opposite sides of the main frame and having straight inner edges parallelly related to the sides of said main frame, and flexible connections connected with said inner plane edges at either side of the plane axis and leading on crossed lines downwardly to said main frame, and separate means for winding and unwinding said flexible connections to independently rotate said sets.

5. In aeroplanes, a main frame, separate sets of rotatable planes the planes constituting a set being on opposite sides of the main frame, and a pair of flexible connections for each set of planes leading on crossed lines from said main frame to the inner ends of each plane, and separate operating devices for said flexible connections to separately change the position of the planes and fix them in such changed position, said planes having transverse supporting shafts provided with a folding joint, and an inclosing frame for said planes detachably connected with the outer ends of said shafts and with the opposite sides of said main frame.

6. In aeroplanes, a skeleton frame having a covered top of rectangular form curved transversely and provided with a centrally located propeller at one end and a deflecting plane transversely at the opposite end and a rudder vertically beneath said plane, in combination with separate sets of independently rotatable shafts having foldable extensions at each side of said top, separate planes supported on said extensions in close parallel relation to one another, and operating means having flexible connections permanently attached to the inside ends of each side plane to rotate said planes and to permit folding thereof without removing said connections.

In testimony whereof I affix my signature in the presence of two witnesses.

ROBERT LEIDORF.

Witnesses:
R. B. MOSER,
F. C. MUSSUN.